United States Patent [19]

Glickman et al.

[11] 4,358,824

[45] Nov. 9, 1982

[54] OFFICE CORRESPONDENCE STORAGE AND RETRIEVAL SYSTEM

[75] Inventors: David Glickman, Frederick, Md.; James T. Repass, Round Rock, Tex.; Walter S. Rosenbaum; Janet G. Russell, both of Bethesda, Md.

[73] Assignee: International Business Machines Corporation, Armonk, N.Y.

[21] Appl. No.: 107,994

[22] Filed: Dec. 28, 1979

[51] Int. Cl.³ ............................................. G06F 15/40
[52] U.S. Cl. .................................... 364/200; 364/300
[58] Field of Search .......... 364/200 MS File, 900 MS FILE,
364/300

[56] References Cited

U.S. PATENT DOCUMENTS

| | | | |
|---|---|---|---|
| 3,702,010 | 10/1972 | Schmidt et al. | 364/300 |
| 3,947,825 | 3/1976 | Cassada | 364/900 |
| 3,995,254 | 11/1976 | Rosenbaum | 340/146.3 WD |
| 4,099,242 | 7/1978 | Houston et al. | 364/200 |

OTHER PUBLICATIONS

IBM System/360 and System/370 (OS) Storage and Information Retrieval System (STAIRS), Sep. 1971.

*Primary Examiner*—Raulfe B. Zache

[57] ABSTRACT

A system that intelligently abstracts and archives a document for storage and interprets a free form user retrieval query to recall the document from the storage file. The system includes a method for automatically selecting keywords from the document using a parts of a speech directory. A method is given for weighing the importance or centrality of each keyword with respect to the document of its origin. Using the same logic paths, a free form query that describes the document in the same manner that it would have to be described to a secretary to "find" it in a filing cabinet, the system automatically determines the key matching terms and finds the archived document(s) with the greatest affinity.

11 Claims, 3 Drawing Figures

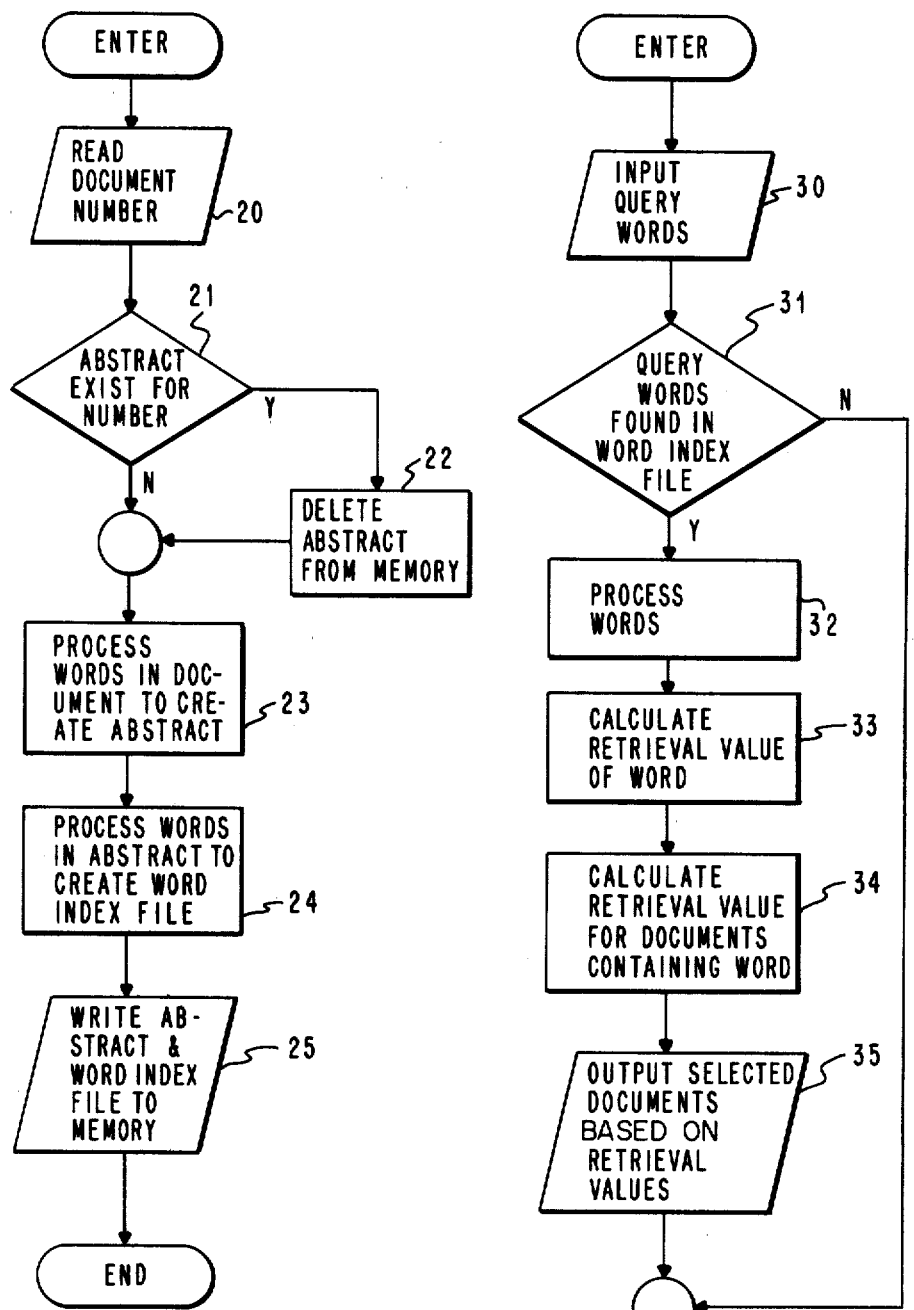

OFFICE CORRESPONDENCE STORAGE AND RETRIEVAL SYSTEM

BACKGROUND OF THE INVENTION

1. Field of the Invention

This invention relates to information storage and retrieval and more particularly to methods of automatically abstracting, storing and retrieving documents using free form inquiry.

2. Description of the Prior Art

In implementing a document storage and retrieval system, the practicality and utility of such a facility is governed by the ease that respective documents are catologed into the system and the efficiency with which a user's request can be associated with the related document catalog representation (description). State of the art document storage and retrieval is based on manually selecting keywords to represent a document in the system's catalog or index and then effecting retrieval by recalling from memory appropriate keyword terms and either automatically or manually searching the index for an "appropriate" level of match against the prestored keywords. Procedures have been developed in the prior art for abstracting documents and retrieving them based on keyword matching. One of the procedures requires the requestor to supply in a fixed format certain details about the subject document such as: author, addressee, date and keywords or phrases. For retrieval, a summary sorted listing is prepared under each of the above headings. The requestor must discern the appropriate document by examining the entries under the retrieval information headings. No latitude is allowed in the search clues. The search may be done by manual perusal or using data processing global find commands.

A second procedure stores all non-trivial words (i.e., ignores articles and pronouns, etc.) in a document as a totally inverted file. The document/line/word position of origin is maintained in the catalog. Search of the database for retrieval is effected by the user supplying keywords based on the user's memory. The catalog is automatically searched with the added facility that the user can specify relations that must exist between the keywords as they exist in the original text (i.e., keyword 1 is before keyword 2, etc.). An example of such a system is the IBM Data Processing Division product Storage and Information Retrieval System, commonly called STAIRS.

A third method for document storage and retrieval is simply storing the document in machine readable form and searching all documents using a "global find" logic for each user supplied keyword. In theory and in practice for small data bases, the "global find" can be replaced by the user reviewing the documents verbatim as they are displayed on a CRT type device.

However, in all the above procedures for document storage and retrieval, the major intelligent burden for abstraction and retrieval association matching is put on the user. Where the system aids in abstraction or matching, it is done at the cost of voluminous cataloging procedures, massive data processing burden and a structure format is required for the user to communicate for retrieval with the system.

SUMMARY OF THE INVENTION

It has been discovered that all non-trivial correspondence is made topic specific by a relatively small number of message specialization terms. These are the words that transfrom the "boiler plate" of business correspondence into the message that the author wishes to convey. These terms consist mainly of numerics, proper names, acronyms, nouns and single purpose adjectives. Any meaningful description of a document for query purposes must contain at least some of these terms which give the document its particular meaning. This invention includes a technique for reliably locating the message specialization terms in a document and forming an abstract of the document using these terms. The technique utilizes the data storage technology disclosed in U.S. Pat. No. 3,995,254 issued Nov. 30, 1976 to W. S. Rosenbaum and incorporated herein by reference to store a dictionary of words for spelling verification, however, other dictionary storage methodologies could also be used. The specialization terms in the dictionary memory additionally have a data bit appended to them to indicate their status as a noun or single purpose adjective. Numerics, proper names, and acronyms are not stored in the dictionary memory. The test of the document is compared with the contents of the dictionary memory and those words that compare to nouns and single purpose adjectives in the dictionary and those words (proper names, numerics, acronyms) not found in the dictionary memory are accumulated to form an abstract of the document. Each word in the abstract is then stored in a word index file. Records in the word index file include the word, the identification code of the document(s) in which the word occurs, the number of times the word occurs in each respective document, an indicator as to whether the word is a numeric, proper name/acronym, noun/single purpose adjective, and an indicator as to whether the word occurs in the header, trailer, body or copy list of the document. (A single purpose adjective is a word whose primary use is adjectival, for example heavy, round, old, new, the colors red, blue, etc.) The words in an input query for retrieval of a document are compared against the word index file. Since some words in the word index file may occur in several documents, weighing factors are accorded each word based on the information stored with the word in the word index file. A score is accumulated for each document that contains any of the words in the retrieval query and those documents with highest scores are presented to the user for review.

BRIEF DESCRIPTION OF THE DRAWINGS

FIG. 2 is a flow chart of the operation in abstracting and storing a document.

FIG. 3 is a flow chart of the operation of the system in retrieving a document in response to a user query.

DESCRIPTION OF THE PREFERRED EMBODIMENT

Figure 1:
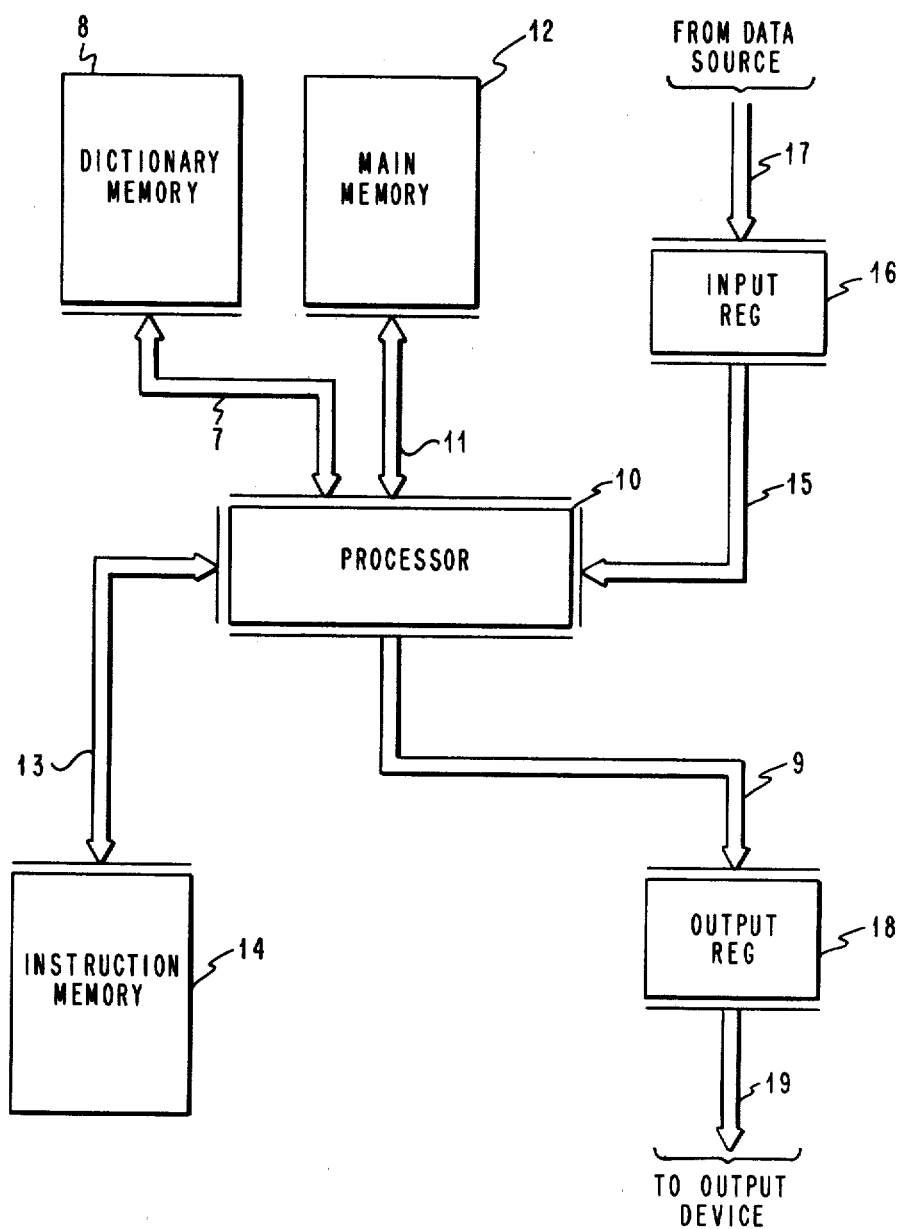
FIG. 1 is a block diagram of system components in the document storage and retrieval system.

Referring to FIG. 1 there is shown a block-diagram of a document storage and retrieval system which includes a processor or CPU 10 of the general purpose type which is capable of decoding and executing instructions. The processor 10 is in two-way communication over bus 13 with a memory 14 containing instructions which control its operation and define the present invention. The processor 10 is also in a two-way communication over bus 7 with memory 8 which contains a partial speech dictionary where all nouns and single purpose adjectives are so noted. The memory 8 contains no numerics, acronyms or proper names. The processor 10 is also in two-way communication over bus 11 with main memory 12 which is used for storing the documents and key word index files. The instruction memory 14 and dictionary memory 8 may be of the read only storage or random access storage type, while the main memory 12 is of the random access storage type.

For document abstracting and archiving an input register 16 receives the text words from a source (not shown) over bus 17. The source may be any of various input devices including keyboard, magnetic tape reader, magnetic cards/disk/diskette files, etc. Text words are presented to processor 10 by register 16 over bus 15 for processing in accordance with instructions stored in instruction memory 14. The results of the processing (abstraction) performed on the text contents of register 16 are transmitted to memory 12 over bus 11.

For document retrieval, input register 16 receives the query text statement from a source (not shown) over bus 17. The source may be any of various input devices such as a keyboard, script table, or especially constituted touchtone pad. The query statement text is presented to processor 10 by register 16 over bus 15 for processing in accordance with instructions stored in instruction memory 14. The processor 10 under control of instructions from instruction memory 14 communicates with the contents of dictionary memory 8 over bus 7 and memory 12 over bus 11 to perform a document retrieval affinity evaluation on the contents of memory 12. The selected document(s) are transmitted from memory 12 over bus 11 and bus 9 to output register 18 and from output register 18 over bus 19 to a utilization device which may take various forms, including a display, printer or voicecoder, etc. The selected document(s) are then presented to the user for review.

The preferred embodiment of the present invention comprises a set of instructions or programs for controlling the document abstracting, archiving and query statement affinity match for retrieval for the document storage and retrieval system shown in FIG. 1. Referring to FIG. 2 there is shown a flow chart of the programs for abstracting and archiving documents.

It is standard practice in data processing systems having on-line storage to assign each record stored a unique identifier code or number. This code is usually eight characters in length and does not contain information that is descriptive of the contents of the record because of the limited length. The identifier code is useful for accessing the records where the user is able to associate the identifier code with a particular record. However, this technique for locating a record become impractical where the data base is large and several users have access to the same records. A record usually retains the same identifier code throughout its existence and modifications to the record replace the record in storage under the same identifier code. The program for abstracting and archiving documents makes use of the identifier code by including it as part of the abstract record. When a document is entered into the System, FIG. 2, the document identifier code or number for the document is read at block 20 and the word index files already stored in the system are compared to determine if a match is found indicating that an abstract is currently stored for the document.

TABLE 1

Document Abstraction Routine

```
BEGINPROCEDURE(OCRS_ABSTRACT);
ENTER ABSTRACT, SAVE DOCUMENT NUMBER PARAMETER;
READ DOCUMENT ABSTRACT FILE RECORD FOR DOCUMENT NUMBER;
IF
RECORD FOUND
THEN
CALL (DELETE_ABSTRACT);
ENDIF;
WHILE
NOT END OF DOCUMENT
DO
WHILE
NOT END OF PAGE
DO
GET NEXT LINE OF TEXT FROM THE DOCUMENT;
WHILE
MORE CHARACTERS EXIST ON THE LINE
DO
GET NEXT WORD FROM THE LINE (2 OR MORE
CONSECUTIVE CHARACTERS A-Z, 0-9, OR
');
IF
THE WORD IS "CC"
THEN
SET CC LINE NUMBER TO THE DOCUMENT
LINE NUMBER MINUS 1;
ENDIF;
CALL (ABSTRACT_PROCESS_WORD);
ENDWHILE;
INCREMENT PAGE NUMBER BY 1;
ENDWHILE;
INCREMENT DOCUMENT LINE NUMBER BY 1;
ENDWHILE;
SET LAST BODY LINE COUNT TO THE LESSOR OF:
THE CC LINE NUMBER AND THE DOCUMENT LINE NUMBER;
DECREMENT THE LAST BODY LINE COUNT BY 4;
CALL (ABSTRACT_END_PROCESSING);
ENDPROCEDURE(OCRS_ABSTRACT):
```

Table 1 is the program routine in Program Design Language (PDL) for abstracting the document. If the document number (identifier code) is found to exist in the abstract file, the program routine branches to the delete abstract routine of Table 2 which is shown as block 22 of the flow chart of FIG. 2.

TABLE 2
Delete Abstract Subroutine

```
BEGINPROCEDURE(DELETE_ABSTRACT);
ENTER DELETE ABSTRACT;
WHILE
NOT END OF DOCUMENT ABSTRACT RECORD
DO
GET THE NEXT ENTRY IN THE DOCUMENT ABSTRACT RECORD;
READ THE WORD INDEX RECORD FOR THE WORD;
WHILE
NOTE END OF WORD INDEX RECORD
DO
GET THE NEXT ENTRY IN THE WORD INDEX RECORD;
IF
THE DOCUMENT NUMBER IN THE ENTRY IS THE
SAME AS THE DOCUMENT NUMBER FROM
THE DOCUMENT ABSTRACT RECORD
THEN
REMOVE THE ENTRY FROM THE WORD INDEX
RECORD;
IF
THERE ARE NOW NO ENTRIES IN THE WORD
INDEX RECORD
THEN
DELETE THE WORD INDEX RECORD FROM
THE FILE;
ELSE
REWRITE THE WORD INDEX RECORD TO THE
FILE;
ENDIF;
ENDIF:
ENDWHILE;
ENDWHILE;
DELETE THE DOCUMENT ABSTRACT RECORD FROM THE FILE;
ENDPROCEDURE(DELETE_ABSTRACT);
```

The delete abstract subroutine of Table 2 deletes the abstract from memory by deleting occurrences of the words in the abstract from the word index file. The makeup of the word index file will be fully explained below.

Following deletion of the existing abstract from memory, or, if no words having the document number are stored in the word index file, the document is processed at block 23 to create an abstract. Referring to the program routine in Table 1, the next word in the document is tested to determine if the Carbon Copy (CC) list follows. If not, the program branches to abstract process word routine in Table 3 to determine if the word should be included in the abstract for the document.

TABLE 3
Abstract Process Word Subroutine

```
BEGINPROCEDURE(ABSTRACT_PROCESS_WORD);
ENTER PROCESS WORD
INCREMENT DOCUMENT WORD COUNT BY 1;
LOOK THE WORD UP IN THE DICTIONARY;
IF
THE WORD WAS FOUND IN THE DICTIONARY BUT
NOT FLAGGED AS A NOUN OR A SINGLE
PURPOSE ADJECTIVE
THEN
IGNORE THIS WORD;
ELSE
IF
THE WORD WAS FOUND IN THE DICTIONARY BUT
FLAGGED AS A NOUN OR A SINGLE PURPOSE
ADJECTIVE
THEN
FLAG THE WORD AS NORMAL;
ELSE
FLAG THE WORD AS ACRONYM;
ENDIF;
```

TABLE 3-continued
Abstract Process Word Subroutine

```
IF
THIS WORD HAS NOT BEEN FOUND PREVIOUSLY IN
THIS DOCUMENT
THEN
SAVE THIS WORD;
SAVE THE DOCUMENT LINE COUNT;
SET FREQUENCY COUNT FOR THIS WORD TO 1;
ELSE
INCREMENT FREQUENCY COUNT FOR THIS WORD BY 1;
ENDIF;
ENDIF;
ENDPROCEDURE(ABSTRACT_PROCESS_WORD);
```

As was previously stated, the criteria for determining whether a word is included in the abstract is whether the word is determined to be a "message specialization term", i.e., a noun, single purpose adjective, proper name, acronym, or numeric. The program routine of Table 3 compares the word to the contents of dictionary memory 108 (FIG. 1). If the word is found in the dictionary memory but it is not a noun or single purpose adjective then the word is ignored. The decision as to whether a word in the dictionary is a noun or single purpose adjective is made at the time of preparation of the dictionary memory 8 and those words designated as nouns or single purpose adjectives have appended to them a code bit. If the word is determined to be a noun or single purpose adjective, a code bit or "flag" is added to the word to indicate as "normal". If the word is not in the dictionary then a code bit or "flag" is added to the word to indicate its status as acronym or proper name. Acronyms and proper names are considered to have more influence as message specialization terms than nouns and single purpose adjectives and therefore are more useful for document retrieval as will be shown below. The Process Word routine of Table 3 controls the processor 10 to save only one copy of each abstract term for storage in the word index file. However, the Process Word routine appends to the word the number of each line in the document where the word appears and a count of the number of times the word appears in the document. As will be seen below for document retrieval, the frequency of occurrence of the word in the document and the place of occurrence help determine the value of the word as a query term for retrieving the document.

Following completion of the Word Process subroutine control returns to the Abstract routine in Table 1 which repeats the routines for each word in the document. The Abstract routine accumulates a count for the number of pages in the document. Upon reaching the end of the document a count is calculated to determine the fifth line from the end of the body of the document and the Abstract End Processing subroutine of Table 4 is selected.

TABLE 4

Abstract End Processing Subroutine

BEGINPROCEDURE(ABSTRACT_END_PROCESSING);
ENTER END PROCESSING;
CREATE A DOCUMENT ABSTRACT RECORD CONSISTING OF;
THE DOCUMENT NUMBER, THE DOCUMENT WORD COUNT, AND
EACH WORD IN THE ABSTRACT;
WRITE THE DOCUMENT ABSTRACT RECORD TO THE FILE;
WHILE
MORE WORDS ARE LEFT TO PROCESS;
DO
READ THE WORD INDEX RECORD FOR THE WORD;
IF
THE RECORD WAS NOT FOUND
THEN
CREATE A WORD INDEX RECORD CONSISTING OF:
THE WORD, THE NORMAL/ACRONYM/PROPER NAME
FLAG, THE DOCUMENT NUMBER, THE FREQUENCY
COUNT, AND A FLAG INDICATING IN HEADER/
TRAILER/CC LIST/BODY;
WRITE THE WORD INDEX RECORD TO THE FILE;
ELSE
ADD THE DOCUMENT NUMBER, THE FREQUENCY COUNT,
AND A FLAG INDICATING IN HEADER/TRAILER/CC
LIST/BODY TO THE RECORD;
REWRITE THE WORD INDEX RECORD TO THE FILE;
ENDIF;
ENDWHILE;
ENDPROCEDURE(ABSTRACT_END_PROCESSING);

The Abstract End Processing subroutine controls the processor 10 to create an abstract record which includes all words saved by the Process Word subroutine of Table 3, a count of the number of words in the document and the document identifier code number. The Abstract End Processing subroutine also creates a Word Index Record for each word in the abstract record which includes the word, the "normal" or "acronym/proper name" code, the document number, the number of pages in the document, the frequency of occurrence of the word in the document, and a code indicating whether the word occurs in the header (first 10 lines), trailer (last 5 lines) or the copy list or body of the document. The words in the Word Index File are searched to determine if a record for the word already appears in the Word Index File. If it does then the record is updated by adding the document number, frequency count, and codes such that no duplicates of the word appear in the Word Index File. Following completion of the Abstract End Processing subroutine of Table 4 control returns to the Abstract routine of Table 1 which terminates the abstracting procedure.

To retrieve a document stored in the system, the requestor must enter a query for the document into the system. This may be done through a keyboard, for example. The queries used with the preferred embodiment of this system can be a natural language statement or string of words that describes the item. The search argument is created by testing the query words against the word index file. In many cases, the words in the search argument will occur in the key word records (abstracts) of several documents. In order to provide better discrimination between contending documents, different weights are applied to different key words. Weighting criteria are applied according to these general rules:

1—Matches on numeric key words are given greater weight than matches on alpha key words.

2—Matches with key words that are proper names or acronyms are given greater weight than matches with nouns or single purpose adjectives that are found in the dictionary memory.

3—The weight assigned to a key word match is proportional to the number of times that the word occurred in the document divided by the log of the number of pages in the document.

4—Matches with key words that occur in the first ten lines of the document are given greater weight than those of key words in the center of the body of text.

5—Matches that occur with key words in the last five lines of text (before any copy lists) are given more weight than matches with words in the center of the text, but less weight than matches with words in the first ten lines.

6—The weight of a key word match is increased when that word is the name of a month or year.

7—The weight of a key word match is inversely proportional to the number of documents in the entire file that contain that key word in the body of the document (excluding occurrences as part of the copy list).

The rationale behind these general rules is to give the greatest weight to those matches that involve key words that have the most narrowly specific meaning. It is assumed that specific names, numbers and dates have very specific meaning so they are weighed heavily. It is also assumed that the most specific items will be mentioned at the beginning or end of the correspondence. Hence, words occurring in these regions are also given greater weight. An example of an expression that satisfies the general rules is the following:

Match Value =

$$\Sigma_{i,j} \frac{F_{i,j} + 10^{Ai} + 10^{Ki} + 10^{Li} + 5^{Ei} + 5^{Hi}}{\log_2 D_i} (1.25)^{Mi}(1.25)^{Yi}$$

where:

$F_{i,j}$ = number of times ith key word appears in jth document divided $\log_2$ of the number of pages in document.

$A_i$ = binary indicator if ith key word is an acronym or proper name.

$K_i$ = binary indicator if ith key word occurs in first 10 lines.

$L_i$ = binary indicator if ith key word is a numeric.

$E_i$ = binary indicator if ith key word occurs in last 5 lines.

$H_i$ = binary indicator if ith key word occurs in the dictionary as a noun or single purpose adjective.

$M_i$ = binary indicator if ith key word is a month.

$Y_i$ = binary indicator if ith key word is a year.

$D_i$ = number of documents that contain ith key word.

Referring to FIG. 3, a flow chart of the processing of a query for a document is shown. At block 30 the user query is input to the processor 10 (FIG. 1) from input register 16 over bus 15. Tables 5, 6, and 7 show program routines for processing the user query according to the general rules stated above.

TABLE 5

| Query Routine |
|---|
| BEGINPROCEDURE(OCRS_QUERY); |
| ENTER QUERY; |
| WHILE |
| MORE QUERY LINES OF TEXT EXIST |
| DO |
| GET THE NEXT LINE OF QUERY TEXT; |
| WHILE |
| MORE CHARACTERS EXIST ON THE LINE |
| DO |
| GET THE NEXT WORD FROM THE LINE (2 OR MORE CHARACTERS A-Z, 0-9, OR '); |
| READ THE WORD INDEX RECORD FOR THE QUERY WORD |
| IF |
| WORD FOUND |
| THEN |
| CALL (QUERY_PROCESS_WORD); |
| ENDIF |
| ENDWHILE; |
| ENDWHILE; |
| CALL (QUERY_END_PROCESSING); |
| ENDPROCEDURE(OCRS_QUERY); |

The Query routine of Table 5 compares the query words to the contents of the word index file as shown in block 31 of the flow diagram of FIG. 3. The query words that match the word index file are processed at block 32 of the flow diagram by the Query Word Process subroutine of Table 6.

TABLE 6

| Query Process Word Subroutine Detailed Logic |
|---|
| BEGINPROCEDURE(QUERY_PROCESS_WORD); |
| ENTER PROCESS WORD; |

TABLE 6-continued

| Query Process Word Subroutine Detailed Logic |
|---|
| IF |
| THE WORD IS A YEAR |
| THEN |
| SET INDICATOR FOR YEAR IN QUERY; |
| ENDIF; |
| IF |
| THE WORD IS A MONTH |
| THEN |
| SET INDICATOR FOR MONTH IN QUERY; |
| ENDIF; |
| IF |
| THE WORD IS NUMERIC |
| THEN |
| SET NUMBER WEIGHT TO 10; |
| ELSE |
| SET NUMBER WEIGHT TO 0; |
| ENDIF; |
| THEN |
| COUNT THE NUMBER OF DOCUMENTS CONTAINING THIS WORD; |
| COUNT THE NUMBER OF DOCUMENTS WHERE THE WORD IS NOT IN THE CC LIST; |
| IF |
| THE WORD INDEX RECORD IS FLAGGED AS AN ACRONYM/ PROPER NAME |
| THEN |
| SET ACRONYM/PROPER NAME WEIGHT TO 10; |
| ELSE |
| SET NORMAL WEIGHT TO 5; |
| ENDIF; |
| WHILE |
| MORE DOCUMENT ENTRIES ARE IN THE WORD INDEX RECORD |
| DO |
| GET THE NEXT DOCUMENT ENTRY FROM THE WORD INDEX RECORD |
| IF |
| THE FLAG INDICATES THAT THE WORD OCCURRED IN THE HEADER |
| THEN |
| SET HEADER WEIGHT TO 10; |
| ELSE |
| SET HEADER WEIGHT TO 0; |
| ENDIF; |
| IF |
| THE FLAG INDICATES THAT THE WORD OCCURRED IN THE TRAILER |
| THEN |
| SET TRAILER WEIGHT TO 5; |
| ELSE |
| SET TRAILER WEIGHT TO 0; |
| ENDIF; |
| IF |
| THE FLAG INDICATES THAT THE WORD OCCURRED IN THE CC LIST |
| THEN |
| SET CC DIVIDE WEIGHT TO 99,999; |
| ELSE |
| SET CC DIVIDE WEIGHT TO 1; |
| ENDIF; |
| SET THE RETRIEVAL VALUE TO: (ACRONYM/PROPER NAME WEIGHT + NUMBER WEIGHT + NORMAL WEIGHT + HEADER WEIGHT + TRAILER WEIGHT + WORD FREQUENCY DIVIDED BY THE LOG BASE 2 OF COUNT OF NUMBER OF PAGES) DIVIDED BY THE LOG BASE 2 OF THE COUNT OF DOCUMENTS NOT CONTAINING THE WORD IN THE CC LIST; |
| DIVIDE THE RETRIEVAL VALUE BY THE CC DIVIDE WEIGHT; |
| IF |
| THIS DOCUMENT HAS NOT BEEN ANALYZED YET IN THIS QUERY |
| THEN |
| SAVE THE DOCUMENT NUMBER; |
| SAVE THE RETRIEVAL VALUE; |
| ELSE |
| INCREMENT THE DOCUMENTS RETRIEVAL VALUE BY THE NEW RETRIEVAL VALUE; |
| ENDIF; |

TABLE 6-continued

Query Process Word Subroutine Detailed Logic

ENDWHILE;
ENDPROCEDURE(QUERY_PROCESS_WORD);

Each query word is tested to determine if it is a month, year, numeric, acronym or normal (noun or single purpose adjective). The subroutine of Table 6 also adds weighting factors if the indicators in the word index file show the word occurs in the first ten lines (Header) of the document, last five lines (Trailer) of the document, or occurs more than once in the document. The value of the word is reduced if it occurs in the copy list of the document or occurs in more than one document. An overall calculation of value for each word is calculated and a total value for all query words that match words in the word index file for each document number having any matches is accumulated. The steps of calculating the retrieval value for words and the retrieval value for documents are shown in block 33 and 34 of FIG. 3. Following processing of all words in the query, the Query routine of Table 5 branches to the Month/Year Evaluation subroutine of Table 7.

TABLE 7

Query Month/Year Evaluation

BEGINPROCEDURE(QUERY_END_PROCESSING);
ENTER END PROCESSING;
IF
THERE WAS A YEAR MENTIONED IN THE QUERY
THEN
INCREMENT THE RETRIEVAL VALUE OF EACH
DOCUMENT THAT DID CONTAIN THE YEAR BY 20%;
ENDIF;
IF
THERE WAS A MONTH MENTIONED IN THE QUERY
THEN
INCREMENT THE RETRIEVAL VALUE OF EACH
DOCUMENT THAT DID CONTAIN THE MONTH BY 20%;
ENDIF;
RETRIEVE THE DOCUMENT NUMBERS OF THE
DOCUMENTS WHOSE RETRIEVAL VALUE IS WITHIN
25% OF THE HIGHEST RETRIEVAL VALUE;
SORT THIS LIST BY THE NUMBER OF WORDS FROM
THE QUERY ACTUALLY OCCURRING
IN THE DOCUMENT;
OUTPUT THE DOCUMENTS;
ENDPROCEDURE(QUERY_END_PROCESSING);

The subroutine of Table 7 increases the retrieval value for each document that contains a year and/or month that matches a year and/or month in the query. The subroutine of Table 7 then controls the processor 10 to output those documents from main memory 12 to output register 18 whose retrieval value is within 25 percent of the highest retrieval value calculated. Control is then returned to the Query routine of Table 5 which terminates the query procedure.

While the invention has been shown and described with reference to a specific set of computer instructions, i.e. PDL, and retrieval weighting values, it will be understood by those skilled in the art that the spirit of this invention can be implemented in other computer languages and the set of document retrieval weighting factors can be modified without avoiding the scope of the invention claimed herein.

What is claimed is:

1. A method for abstracting and archiving a document in machine readable form comprising the steps of:
   (a) storing a dictionary of language terms commonly used in document preparation;
   (b) appending codes to the language terms in said dictionary of language terms to identify selected parts of speech;
   (c) comparing the language terms in an input document with the stored dictionary of language terms;
   (d) selecting language terms from said input document which do not compare to the stored dictionary of language terms;
   (e) selecting language terms from said input document which compare with language terms in said stored dictionary of language terms identified as selected parts of speech;
   (f) coding the selected language terms with the identity of the input document; and
   (g) storing the selected language terms for later recall.

2. The method of claim 1 further including the steps of accumulating a count for the number of times each of the selected language terms occurs in the input document and accumulating a count of the number of pages in the input document.

3. The method of claim 1 or claim 2 further including the step of appending to each selected language term a code indicating the position of occurrence of the selected language term in the input document.

4. A method for retrieving a document from storage in response to input language terms descriptive of the content of the document comprising the steps of:
   (a) comparing each of the input language terms to stored document abstract files of language terms, each document abstract language term having associated with it a code identifying its part of speech, a count indicating its frequency of occurrence in the document, a count of the number of pages in the document, and an indicator of the position of occurrence of the term in the document;
   (b) accumulating a retrieval record for each document abstract file composed of the language terms that compare equal;
   (c) calculating a document retrieval value for each retrieval record using the part of speech code, frequency count, number of pages in the document, and position indicator for each language term in the retrieval record;
   (d) increasing the document retrieval value for each retrieval record that includes a month and/or year; and
   (e) selecting the document corresponding to the highest calculated retrieval value for output.

5. The method of claim 4 further including the step of selecting all documents whose calculated retrieval value is equal to or greater than a predetermined percentage of the highest calculated retrieval value.

6. A system for abstracting a document in machine readable form comprising:
   means for storing a dictionary of language terms commonly used in document preparation, said language terms including a code identifying certain ones of said language terms as selected parts of speech;
   means for receiving an input document of language terms in machine readable form, said input document including an identification code;
   a memory;
   control means connected to said means for storing, said means for receiving and said memory, including, means for comparing the language terms of said input document to said dictionary of language terms, first selecting means responsive to said means for comparing for selecting the language terms from said input document that compare unequal, second selecting means responsive to said means for comparing for selecting the language terms from said input document that compare equal and are coded as selected parts of speech;

first counting means responsive to said first and second selecting means for counting the frequency of occurrence of each selected language term in the input document;

second counting means responsive to said means for receiving for counting the number of pages in the document;

means responsive to said first and second selecting means for calculating the position of occurrence of the selected language terms in the input document; and means responsive to said first and second selecting means, said first and second counting means, and said means for calculating for storing in said memory a record of each selected language term including the document identification code, the language term, the selected part of speech code, the frequency of occurrence count, the count of pages in the document, and the position of occurrence code.

7. The system of claim 6 wherein said control means further includes means for comparing each selected language term from the input document to selected language terms currently stored in said memory, and means responsive to an equal compare for adding to the record of the selected language term stored in said memory the identification code of the input document, the frequency of occurrence count, and position of occurrence code for the selected language term, thereby eliminating the need for duplicate storage of the selected language term.

8. A system for retrieving a document from storage in response to an input query of language terms descriptive of the content of the document comprising:

a memory having stored therein language term records including the language term, identification codes of documents containing the language term, a selected parts of speech code, a frequency of occurrence count for the language term, a count of pages in each document, and a position of occurrence code for each document identification code in each language term record;

means for comparing the language terms of the input query to language term records stored in said memory;

means for accumulating a retrieval record for each document identification code of each language term that compares equal;

means responsive to said means for accumulating for calculating a document retrieval value for each retrieval record using the selected part of speech code, frequency of occurrence count, count of pages and position of occurrence code; and means responsive to said means for calculating for outputting from memory the document whose identification code corresponds to the identification code for the highest calculated retrieval value.

9. The system of claim 8 wherein said means for calculating further includes means for increasing the document retrieval value for each retrieval record that includes a month that compares equal to a term in the input query and further increasing the document retrieval value for each record that includes a year that compares equal to a term in the input query.

10. The system of claim 8 or claim 9 wherein said means for calculating includes means calculating a percentage of the highest calculated retrieval value for each document identification code and said means for outputting further includes means for outputting all documents whose retrieval value exceeds a predetermined percentage of the highest calculated retrieval value.

11. The system of claim 10 wherein means for outputting further includes means for selecting documents for display in the descending order of the number of query terms that matched langugage term records for the document.

* * * * *